April 18, 1961 D. J. MILLARD 2,980,067
HYDRAULIC ACTUATOR SYSTEM WITH FEEDBACK
Filed July 25, 1958 2 Sheets-Sheet 1

INVENTOR
BY DENNIS JOHN MILLARD
ATTORNEY

INVENTOR.
DENNIS JOHN MILLARD
BY
Morgan, Finnegan, Durham & Pine
ATTORNEYS

United States Patent Office 2,980,067
Patented Apr. 18, 1961

2,980,067

HYDRAULIC ACTUATOR SYSTEM WITH FEEDBACK

Dennis John Millard, Wolverhampton, England, assignor to Boulton Paul Aircraft Limited, Wolverhampton, England Filed July 25, 1958, Ser. No. 751,078

Claims priority, application Great Britain Aug. 12, 1957

2 Claims. (Cl. 121—41)

This invention relates to hydraulically operated servo systems and is more particularly, but not exclusively applicable to servo systems which are used for providing power-assisted steering for motor vehicles.

It is an object of the present invention to provide a servo arrangement which will feed back a portion of the output load acting on the steering mechanism in such manner as to provide resistance to the rotation of the steering wheel, that is to say, the servo system provides "feel" at the steering wheel.

According to the present invention there is provided in a hydraulic servo system comprising a follow-up hydraulic servo valve arranged for controlling the operation of a hydraulic actuator, means for feeding back to the input member of the servo system a proportion of the output load of the system by so arranging the servo valve that its position remains constant relative to the actuator and by applying across the effective area of the servo valve fluid pressure from the hydraulically effective sides of the actuator so that the proportion of the load fed back is a ratio of the effective area of the servo valve to the effective area of the actuator.

Figure 1:
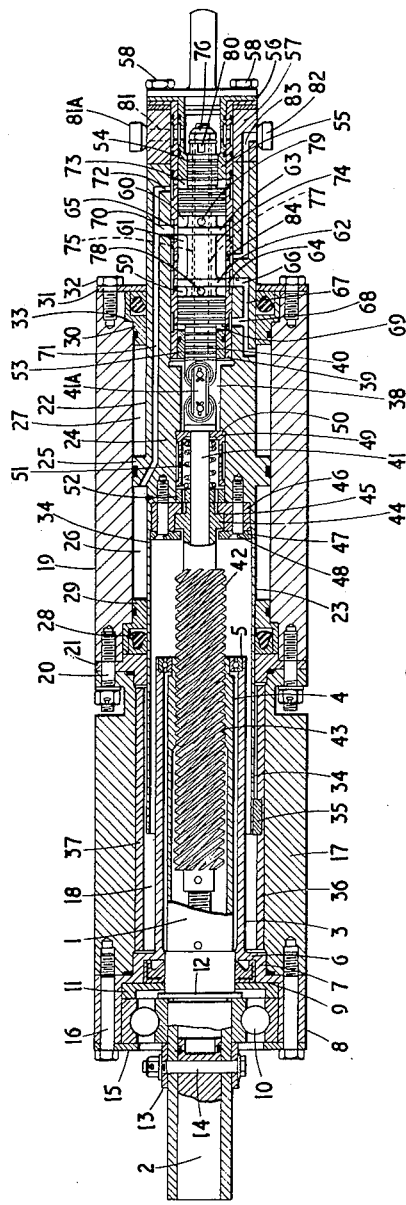
Figure 2:
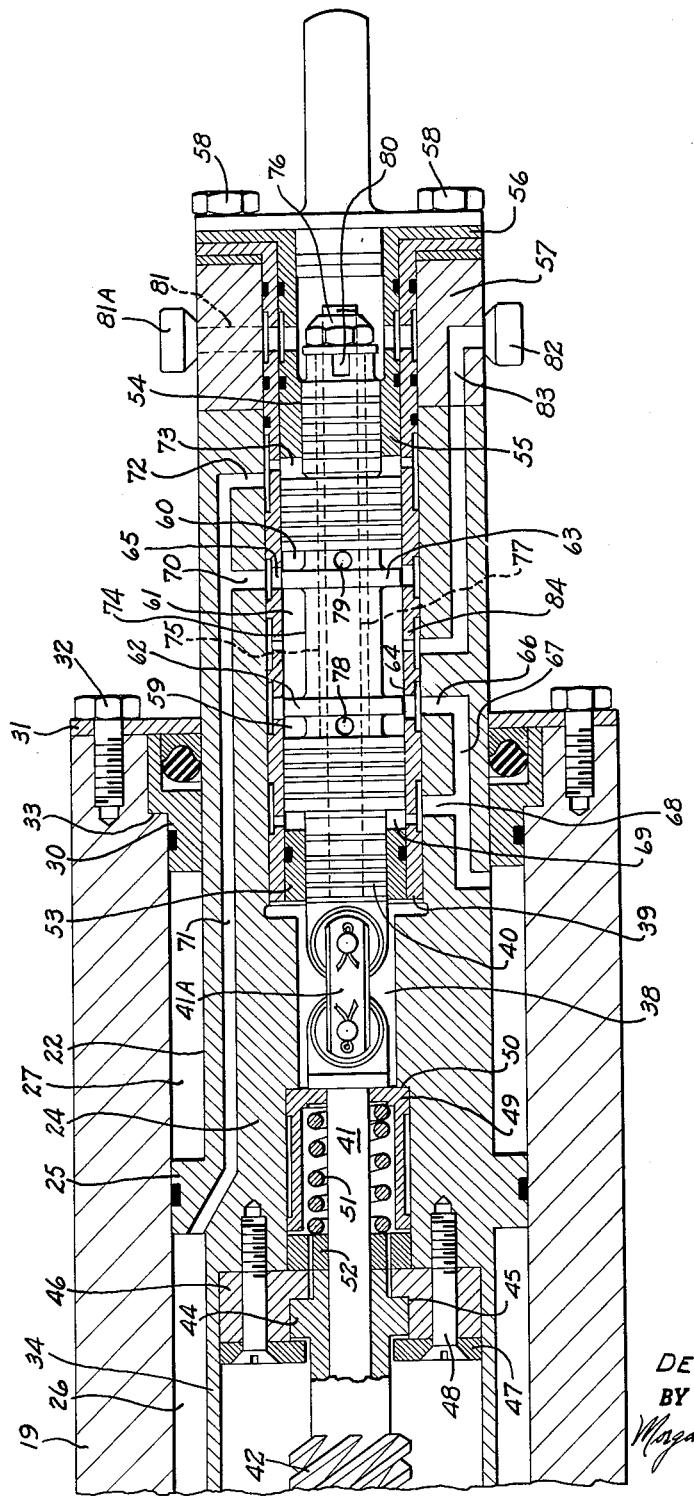

For a better understanding of the invention and to show how the same may be carried into effect reference will now be made to the accompanying drawings of which Figure 1 is a cross-sectional elevation of a servo mechanism according to the invention as applied to a power assisted steering arrangement for a motor vehicle and Figure 2 is an enlargement of a section of Figure 1.

The hollow end portion 1 of a steering column 2 is rotatably mounted within a cylindrical sleeve 3, the inner end of the sleeve 3 supporting the innermost end 4 of the portion 1 via a ball race 5. The other end 6 of the sleeve 3 is enlarged to provide a cylindrical cup 7 having a relatively thick annular wall 8. A step 9 is formed in the cup 7. A ball race 10 is located in the cup 7, the ball race 10 supporting the portion 1 relative to the other end 6 of the sleeve 3. The outer race of the ball race 10 abuts an annular member 11 which rests on the step 9, whilst the inner race of the ball race 10 bears against the flange 12 formed on the portion 1. The ball race 10 is held against the flange 12 by a ring 13 secured to the steering column 2 by a bolt 14, and against the member 12 by a plate 15 secured to the wall 8 by six equi-angularly spaced bolts 16.

The bolts 16 also serve to secure the wall 8 to a housing 17 with a cylindrical bore, the housing 17 is coaxially positioned about the sleeve 3. When the sleeve 3 and the housing 17 are so positioned a cylindrical chamber 18 is formed therebetween.

A further housing 19 having a cylindrical bore, serving as a ram body is connected to the sleeve 17 by studs 20 there being an annular member 21 interposed between the abutting housings 17 and 19.

The cylindrical ram rod 23 of the power-assisted steering arrangement has an external diameter which is less than the internal diameter of the housings 17 and 19 so that when the ram rod 22 is introduced into the housings 17 and 19 a cylindrical chamber is formed between the ram rod and the housing 19.

The ram rod 22 can be regarded as consisting of two sections 23 and 24 extending to either side of an outwardly directed annular flange 25 which is a sliding fit within the housing 19 and constitutes the ram or actuator. It will be seen that the flange 25 divides said cylindrical chamber into two cylindrical chambers 26 and 27. The chamber 26 is defined by the flange 25, part of the housing 19, a part of ram rod section 23, and a gland 29 containing a fluid-tight sealing means 28. The sealing means 28 is maintained in a fixed position relative to the housing 19 by the annular member 21 which forces the sealing means 28 against the walls and the base of the gland 29. The chamber 27 is defined by the flange 25, part of the housing 19, a part of ram-rod section 24 and a fluid-tight sealing means 30. The sealing means 30 is maintained in a fixed position relative to the housing 19 by a retaining ring 31 which is secured on to the end of the sleeve by bolts 32, the ring clamping a part of the sealing means 30 against a step 33 formed in the housing 19.

The ram-rod section 23 is in the form of a cylindrical sleeve 34 which extends into the chamber 18. The length of the sleeve 34 is such that no matter where the flange 25 is positioned within the housing 19, the free end of the sleeve 34 is always located in the chamber 18.

One or more splines 35 are provided on the sleeve 34. The splines engage grooves 36 formed in a liner 37 which is located within, and fixed relative to, the sleeve 3. The co-operation of the splines 35 with the grooves 36 provides an anti-rotation device which allows the ram body 23 to move axially of the housings 17 and 19, but prevents the ram body from rotating relative to these housings. The ram-rod section 24 projects from the end of the housing 19. An axial bore 38 is formed in the ram-rod section 24 and although having sections of different diameters, extends the whole length of the section 24 and communicates with the inner end of the sleeve 34, that is, adjacent to the flange 25.

The bore 38, at the end of the ram-rod section 24 more remote from the flange 25 is slightly increased in diameter to receive a cylindrical liner 39 for the control piston or master element 40 of a hydraulic follow-up servo valve. The piston 40 is coupled with a connecting rod 41 by way of a link coupling 41A. The rod 41 extends through the remainder of the ram-rod section 24 axially through the ram-rod section 23, into the interior of the end portion 1. An external worm 42 is mounted on the connecting rod 41, and is pinned thereto. The worm 42 engages with internal worm teeth 43 formed at the end of the portion 1.

The worm 42 is constrained from rotating with respect to the ram rod 22, by means of splines 44. The splines 44 co-operate with complementary grooves 45 formed in a member 46 which is secured to the base of the ram-rod section 23. The ends of the splines 44 also act as abutments which co-operate with one side of the member 46 so as to limit the axial movement of the connecting rod 41 in a first direction. The axial movement of the connecting rod 41 in the reverse direction is limited by the co-operation of an annular plate 47 with the other ends of the splines 44. The plate 47 is secured to the member 46 by bolts 48 which also serve to mount the member 46 on the ram-rod section 24.

The end of the bore 38 adjacent to the member 46 is enlarged to receive a sleeve 49 having an annular base 50. The sleeve 49 is spring-loaded by a spring 51 bearing at one end against the base 50, and at the other end against a member 52 provided on the connecting rod 41.

The end of the piston 40, which is adjacent to the link coupling 41A is reduced in diameter, and slidingly engages with a sleeve 53 on the inner end of the liner 39, The outer end part 54 of the piston 40 is reduced in diameter and slidingly engages in a sleeve 55 having an outwardly directed flange 56. A distribution unit 57 for hydraulic fluid is secured to the end of the ram-rod section 24, by bolts 58. The bolts 58 also engage the flange or liner 39 and flange 56 on sleeve 57 thereby securing the liner 39 and sleeve 57 within the ram rod 24.

Two narrow annular channels 59 and 60, and a relatively wider annular channel 61 are formed in the piston 40. The annular channels are separated by lands 62 and 63. The lands 62 and 63 respectively co-operate with fluid ports 64 and 65 formed in the liner 39. The relative dimensioning of the ports and the associated lands is such that the lands do not seal the ports when the lands are symmetrically positioned relative to the ports. The port 64 is connected via a bore 66 with a bore 67 extending axially of the ram rod 22. Bore 67 communicates, via a bore 68 extending through the ram rod 22 and the liner 39, with a small chamber 69.

The port 65 is connected by way of a bore 70 with a bore 71 extending axially of the ram rod 22. One end of the bore 71 leads to the chamber 26. The bore 71 is also connected via a bore 72 with a small annular chamber 73.

The effective area of the control piston 40 is constituted by the annular surfaces of the piston which form the movable walls of the chambers 69 and 73. This effective area is chosen to be a definite proportion of the effective area of the ram 25.

The piston 40 is constituted by a sleeve 74 carried on a rod 75. The rod 75 projects from each end of the sleeve 74. One end of the rod forms part of the joint 41A, and the other end is threaded to receive a nut 76 which forces the sleeve 74 against a flange provided on the one end of the rod.

The internal diameter of the major portion of the sleeve is greater than the diameter of the rod so that an axially directed cylindrical chamber 77 is formed within the piston 40. The recesses 59 and 60 communicate with the chamber 77 via ports 78 and 79.

The end of the sleeve nearest the nut 76 is slotted as at 80, the slots 80 providing inlet ports to the chamber 77.

A bore 81 leads from the interior of the sleeve 55, in which the slotted end of the piston is located through the liner 39 and the unit 57 to a coupling unit 81A for a conduit (not shown) which is used to return fluid to a supply (not shown).

Fluid from the supply is fed, via a coupling nut 82, and a bore 83 which enters the unit 57, and runs axially of the ram-rod section 22 to a port 84, the latter leading to the annular channel 61.

It is seen that with the piston 40 and ram 22 positioned as shown in the figure, that there is a continuous fluid path between the fluid supply coupling unit 82 and the fluid return coupling unit 81A, so that a low pressure acts in all parts of the system. This fluid path extends from the coupling unit 82, the bore 83, the port 84 to the annular channel 61. From the annular channel 61 the fluid path extends via the port 64, the bores 66, 67 and 68 to the chamber 27, and via the port 64, the bores 66, 67 and 68 to the chamber 69, via the port 65, the bores 70 and 71 to the chamber 26, via the bores 70 and 72 to the chamber 73 and by way of the lands 62 and 63 respectively through the ports 78 and 79 to the chamber 77, and thence through slots 80 and bore 81 to the return coupling unit 81A.

Upon rotating the steering column 2 relative motion is produced between the worms 42 and 43. Since the worm 42 is prevented from rotating by the engagement of the splines 44 with the grooves 45 and the engagement of the splines 35 with the grooves 36, the worm 42 is forced to move axially of the portion 1.

For the purpose of the description it will be assumed that the worm 42 travels outwards from the end portion 1 when the latter is turned anti-clockwise, and that the worm retracts into the portion 1 when the latter is turned clockwise.

Consequently, an anti-clockwise rotation of the steering column moves the piston 40 relative to the ram-rod 22 towards the right-hand side of the figure. The amount of relative movement is limited by the engagement of the ends of the splines 44 with the member 46. However, the relative movement is sufficient to cause the land 62 to isolate the port 64 from the annular channel 61 and to prevent fluid flow from the port 65 into the annular channel 60.

Hence the chamber 27 is only in connection with the return or low pressure side of the supply, the connection being via the bores 67, 66, the annular channel 59, the port 78, the chamber 77, the slot 80, the bore 81 and the coupling unit 81A to the low pressure side of the supply, whereas the chamber 26 is connected to the high pressure side of the supply via the bores 71 and 70, the port 65, the annular channel 61, the port 84, the bore 83 and the coupling unit 82. Consequently, a pressure is built up within the chamber 26 which causes the ram-rod 22 to move in the same direction as the original piston movement. The ram-rod 22 will move until the lands 62 and 63 are centrally positioned relative to the ports 64 and 65. In this way the ram-rod 22 follows up the motion of the piston 40 in such manner as to maintain a constant positional relationship between the piston 40 and the ram-rod 22. It is clear that the above described sequence of events takes place many times during a steering movement of the steering column 2.

During the existence of the pressure built up within the chamber 26, a similar pressure build-up is produced within the chamber 73 since this is in direct fluid connection with the chamber 26. In addition since the chamber 69 is in direct connection with the chamber 27, the pressure in chamber 69 is reduced in relation to that in the chamber 73. Consequently, a pressure difference exists across the piston, the pressure difference acting in the opposite direction to that acting upon the ram 25. The pressure difference across the piston is transmitted through the worm 42, to the steering column, thereby producing resistance to the rotation of the latter.

The pressure difference appearing across the piston is proportional to the pressure difference produced across the effective sides of the ram 25, the proportion being the ratio between the effective areas of the ram 25 and the piston 40. In other words a proportion of the output load of the ram rod 22 is used to resist the rotation of the steering column, i.e. to provide "feel" at the steering column during a steering movement of the latter.

It is to be noted that in the event of breakdown in the hydraulic pressure, the fact that the movement of the piston 40 relative to the ram-rod is limited by the splines 44, permits direct manual control of the ram-rod 22.

The self-centering action of the road wheels in a conventional manner due to castoring will apply a sufficient force to the ram-rod 22 to produce a pressure difference across the piston 40 which will turn the steering column 2 and so provide self-centering of the steering.

This self-centering action is assisted by means of the compression spring 51 located within the sleeve 49. The coupling 41A can comprise other forms of coupling such as a ball and socket joint.

The type of pump used is preferably a fixed stroke pump safeguarded by a blow-off valve. The unit is designed so that when there is no movement, the pressure built up from the pump is only that required to force the oil through the valve of the steering unit. When the unit is operated the pressure will be determined by the external load from the road wheels up to a maximum pressure determined by the setting of the blow-off valves.

I claim:

1. A hydraulic servo system energized from a fluid source having output and return terminals and adapted to actuate a controlled member from an input member comprising a servo valve coupled to said input member and responsive thereto, an actuator within which said servo valve is housed, said actuator being coupled to said controlled member for actuating the same, a hydraulic duct system including a high pressure passageway in said actuator connected to said output terminal of said fluid source, a low pressure passageway in said valve coupled to the return terminal of said fluid source, said duct system also including a first control passageway communicating with one side of said actuator, with one side of said valve and with a first control port, said duct system also including a second control passageway communicating with the other side of said actuator, with the other side of said valve and with a second control port, a plurality of lands included in said servo valve, said lands being operatively associated respectively with said first and second control ports and having effective cut-off surfaces smaller than said first and second control ports whereby, with said input member and servo valve in a reference position, the output terminal communicates with the return terminal of said fluid source and with both sides of said valve and said actuator, but with the input member and servo valve displaced, the output terminal of said source is disconnected from one of said control passageways and the associated control port, valve side and actuator side such that a hydraulic force is applied to said actuator which tends to restore the actuator relative to the valve, to the reference position, and concurrently, a feedback force is applied to said input member via said valve.

2. Apparatus according to claim 1 in which said input member is rotatably actuated and includes spline means adapted to constrain said actuator from undergoing rotary movement, said spline means concurrently servng in combination with abutment means on said actuator to mechanically couple said input member to said actuator after a predetermined displacement of said input member and in the event of hydraulic failure.

References Cited in the file of this patent

UNITED STATES PATENTS

| | | |
|---|---|---|
| 1,790,620 | Davis | Jan. 27, 1931 |
| 2,313,704 | Hey | Mar. 9, 1943 |
| 2,317,549 | Muller | Apr. 27, 1943 |
| 2,393,585 | Boynton et al. | Jan. 29, 1946 |
| 2,710,596 | Folkerts | June 14, 1955 |
| 2,788,770 | Folkerts | Apr. 16, 1957 |
| 2,854,955 | Vier | Oct. 7, 1958 |